United States Patent
Dickson (10) Patent No.: US 9,646,035 B1
(45) Date of Patent: May 9, 2017

(54) CENTRALIZED METAOBJECT INGEST USING A TEMPORALLY-EXPANDED BLOOM FILTER

(71) Applicant: Veritas Technologies LLC, Mountain View, CA (US)

(72) Inventor: Christopher Dickson, Roseville, MN (US)

(73) Assignee: Veritas Technologies LLC, Mountain View, CA (US)

( * ) Notice: Subject to any disclaimer, the term of this patent is extended or adjusted under 35 U.S.C. 154(b) by 560 days.

(21) Appl. No.: 13/871,832

(22) Filed: Apr. 26, 2013

(51) Int. Cl.
*G06F 17/30* (2006.01)

(52) U.S. Cl.
CPC .... *G06F 17/3033* (2013.01); *G06F 17/30551* (2013.01)

(58) Field of Classification Search
CPC ......... G06F 17/30864; G06F 17/30312; G06F 17/3033; G06F 17/30699; G06F 2201/82; G06F 11/2094; G06F 17/30091; G06F 17/30156; G06F 3/0647
USPC ............ 707/754, 706, 736, 741, E17.005, 707/E17.014, E17.032, E17.044, E17.059, 707/690, 692, 722, 769, 802, E17.052, 707/E17.109, E17.127, 609, 610, 639, 707/691, 711, 737, 747, 758, 767, 770, 707/812; 709/224, 204, 213, 217, 225, 709/238, 203, 206, 208, 214, 220, 223; 711/103, E12.026, 106, 114, 135, 136, 711/141
See application file for complete search history.

(56) References Cited

U.S. PATENT DOCUMENTS

| | | | |
|---|---|---|---|
| 7,636,703 B2* | 12/2009 | Taylor | G06F 19/22 706/62 |
| 8,290,972 B1* | 10/2012 | Deshmukh | G06F 17/30489 707/758 |
| 2008/0071904 A1* | 3/2008 | Schuba | H04L 43/18 709/224 |
| 2011/0307447 A1* | 12/2011 | Sabaa | H04L 67/2842 707/637 |
| 2012/0310960 A1* | 12/2012 | Watanabe | G06F 17/30946 707/756 |

* cited by examiner

*Primary Examiner* — Jay Morrison
*Assistant Examiner* — Ken Hoang
(74) *Attorney, Agent, or Firm* — Wilmer Cutler Pickering Hale and Dorr LLP (57) ABSTRACT

A server computer system identifies a first bloom filter using a schedule that rotates bloom filters based on time. The system identifies a first set of metaobjects to evaluate for ingestion using the first bloom filter and determines whether to add one or more of the metaobjects to a data store using the first bloom filter. The system identifies a second bloom filter using the rotation in the schedule and identifies a second set of metaobjects to evaluate for ingestion using the second bloom filter. The second set of metaobjects includes one or more metaobjects that are the same as one or more metaobjects in the first set of metaobjects. The system determines whether to add one or more of the second set of metaobjects to the data store using the second bloom filter.

20 Claims, 6 Drawing Sheets

CENTRALIZED METAOBJECT INGEST USING A TEMPORALLY-EXPANDED BLOOM FILTER

TECHNICAL FIELD

The present disclosure relates to data ingestion, and more particularly, to providing a centralized optimized metaobject ingest using a temporally-expanded bloom filter.

BACKGROUND

Data ingestion is bringing data into a system. The data may be from multiple data sources, may be in different formats, and the amount of data may be substantial. Backup systems, typically, ingest and re-ingest a significantly large amount of metadata into a database on a daily basis to store location information and content information for the files being backed up. Generally, the metadata contains predominantly the same content day after day, along with a small proportion of new or changed content. Repeatedly ingesting the same data is costly and unwarranted in most cases. Some traditional ingestion systems may first query the database to determine whether certain metadata is already stored in the database. Some conventional backup systems may use an image of a previous backup to identify any changes in the data before digesting the data, which may limit the system to organizing metadata on a per-backup basis or a per-client basis. A bloom filter is a probabilistic data structure that is used to test whether an element is a member of a set. False positive retrieval results are possible with bloom filters, but false negatives are not. Use of a bloom filter in an ingestion system is generally inappropriate, because it can only return a result that particular metadata "may be inside a set" or "definitely is not inside the set". A bloom filter does not return a definitive result that an element is inside a set. Traditional backup systems, where integrity and performance are important, therefore find little value in using conventional bloom filters for the purpose of ingest optimization.

SUMMARY

In one implementation, a system for providing centralized ingestion of metaobjects using temporally expanded bloom filters is described. An example system may include a memory and a processing device that identifies a first bloom filter using a schedule that rotates a plurality of bloom filters based on time. The system identifies a first plurality of metaobjects to evaluate for ingestion using the first bloom filter and determines whether to add one or more of the metaobjects to a data store using the first bloom filter. The system identifies a second bloom filter using the rotation in the schedule and identifies a second plurality of metaobjects to evaluate for ingestion using the second bloom filter. The second plurality of metaobjects includes one or more metaobjects that are the same as one or more metaobjects in the first plurality of metaobjects. The system determines whether to add one or more of the second plurality of metaobjects to the data store using the second bloom filter.

In one implementation, bloom filters correspond to different time periods. In one implementation, the first plurality of metaobjects and the second plurality of metaobjects are associated with a backup data, archive data, data loss prevention data, anti-virus data, and/or discovery data. In one implementation, the system further encodes an initial set of metadata items to create an initial plurality of metaobjects, performs a hash function on the initial plurality of metaobjects to generate a plurality of hash values, divides each of the plurality of hash values into subsets of hash values, and sets bits in the first bloom filter or the second bloom filter using the subsets of hash values.

In one implementation, the first plurality of metaobjects and the second plurality of metaobjects comprise an identifier of a file, an owner of the file, a time of modifying the file, protection bits for the file, and/or a pathname for the file. In one implementation, the system determines whether to add one or more of the first plurality of metaobjects to the data store comprises, performs a hash function on each of the first plurality of metaobjects to generate a plurality of hash values, locates a bit in the first bloom filter that corresponds to a binary value of a subset of the hash value for each hash value, and adds the corresponding metaobject to the data store if the bit indicates that the corresponding metaobject is not stored in the data store.

In one implementation, the system further identifies data indicating a number of new metadata items associated with at least one of the first plurality of metaobjects or the second plurality of metaobjects, determines that the number of new metadata items does not match at least one of a number of the first plurality of metaobjects added to the data store or a number of the second plurality of metaobjects added to the data store, identifies one or more metadata items to be added to the data store, and adds one or more metaobjects corresponding to the one or more metadata items to the data store.

Further, a method for providing centralized ingestion of metaobjects using temporally expanded bloom filters is described. In one implementation, the method comprises identifying a first bloom filter using a schedule comprising a rotation of a plurality of bloom filters based on time, identifying a first plurality of metaobjects to evaluate for ingestion using the first bloom filter, determining whether to add one or more of the first plurality of metaobjects to a data store using the first bloom filter, identifying a second bloom filter using the rotation in the schedule, and identifying a second plurality of metaobjects to evaluate for ingestion using the second bloom filter. The second plurality of metaobjects comprising one or more metaobjects the same as one or more metaobjects in the first plurality of metaobjects. The method further includes determining whether to add one or more of the second plurality of metaobjects to the data store using the second bloom filter.

In one implementation, the bloom filters correspond to different time periods. In one implementation, the first plurality of metaobjects and the second plurality of metaobjects are associated with a backup data, archive data, data loss prevention data, anti-virus data, and/or discovery data. In one implementation, the method further includes encoding an initial set of metadata items to create an initial plurality of metaobjects, performing a hash function on the initial plurality of metaobjects to generate a plurality of hash values, dividing each of the plurality of hash values into subsets of hash values, and setting bits in the first bloom filter or the second bloom filter using the subsets of hash values.

In one implementation, the first plurality of metaobjects and the second plurality of metaobjects comprise an identifier of a file, an owner of the file, a time of modifying the file, protection bits for the file, and/or a pathname for the file. In one implementation, the method further includes determining whether to add one or more of the first plurality of metaobjects to the data store comprises, performing a hash function on each of the first plurality of metaobjects to generate a plurality of hash values, locating a bit in the first bloom filter that corresponds to a binary value of a subset of the hash value for each hash value, and adding the corresponding metaobject to the data store if the bit indicates that the corresponding metaobject is not stored in the data store.

In one implementation, the method further includes identifying data indicating a number of new metadata items associated with at least one of the first plurality of metaobjects or the second plurality of metaobjects, determining that the number of new metadata items does not match at least one of a number of the first plurality of metaobjects added to the data store or a number of the second plurality of metaobjects added to the data store, identifying one or more metadata items to be added to the data store, and adding one or more metaobjects corresponding to the one or more metadata items to the data store.

In addition, a non-transitory computer readable storage medium for providing centralized ingestion of metaobjects using temporally expanded bloom filters is described. An exemplary non-transitory computer readable storage medium includes instructions that will cause a processing device to perform a method that includes identifying a first bloom filter using a schedule comprising a rotation of a plurality of bloom filters based on time, identifying a first plurality of metaobjects to evaluate for ingestion using the first bloom filter, determining whether to add one or more of the first plurality of metaobjects to a data store using the first bloom filter, identifying a second bloom filter using the rotation in the schedule, and identifying a second plurality of metaobjects to evaluate for ingestion using the second bloom filter. The second plurality of metaobjects comprising one or more metaobjects the same as one or more metaobjects in the first plurality of metaobjects. The method further includes determining whether to add one or more of the second plurality of metaobjects to the data store using the second bloom filter.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and system for providing centralized ingestion of metaobjects using temporally expanded bloom filters, according to various implementations. A bloom filter is a data structure (e.g., bit array, bit vector) that provides a compact representation of a set of data being stored. Bloom filters use hash functions to index the data structure. The bit values in the data structure can be set to represent the data that is stored. For example, the data set being stored may be {x, y}. A hash function may be applied to "x" to compute a hash value for "x". The hash value for "x" corresponds to a bit in the bloom filter data structure. The bit may be set to "1" to indicate that "x" is part of the data set that is stored. The hash function may be applied to "y" to compute a hash value for "y", and the bit in the bloom filter that corresponds to the hash value for "y" may be set to "1" to indicate that "y" is part of the data set that is stored. Bloom filters return results to show that data "may be inside a set" or "definitely is not inside the set". A bloom filter does not return a definitive result that an element is inside a set. For example, when the bloom filter is checked to determine whether "x" is already stored, the bloom filter determines that the bit that corresponds to the hash value for "x" is set to "1," and returns a result that "x may be stored". When the bloom filter is checked to determine whether "z" is already stored, the bloom filter determines that the bit that corresponds to the hash value for "z" is set to "0," and returns a result that "z is not stored". Implementations expand the bloom filter "temporally" by rotating through different bloom filters based on time to increase the integrity of the expanded bloom filter and decrease the likelihood of the expanded bloom filter returning false positives.

A "metaobject" hereinafter refers to an object in a data store (e.g., database, flat files, etc.) that can include and/or reference "context metadata" items and/or "content metadata" items for a file. An object can be a data structure (e.g., table). Context metadata items provide information about a file. Examples of context metadata item for a file can include, and are not limited to, an identifier of a file, an owner of the file, a time of modifying the file, protection bits for the file, or a pathname for the file. Content metadata items can provide information about the content of a file. An example of a content metadata item for a file can include, and is not limited to, a fingerprint of the content of a file. The metaobjects can be stored in a data store (e.g., database).

Implementations of the present disclosure determine whether to add metaobjects to the data store using temporally expanded bloom filters. Various systems (e.g., backup, archive, anti-virus, data loss protection, etc.) may create and/or use context metadata items and/or content metadata items. Implementations also provide a central data store to store the metaobjects for the context metadata items and content metadata items for the various systems. Implementations also reduce the amount of processing to ingest and maintain context metadata items and/or content metadata items with per-object (as opposed to per-backup/client) granularity, by orders of magnitude. Implementations can help unify system (e.g., data protection, backup, archiving, data loss prevention, anti-virus, discovery, etc.) content indexing and information management.

Figure 1:
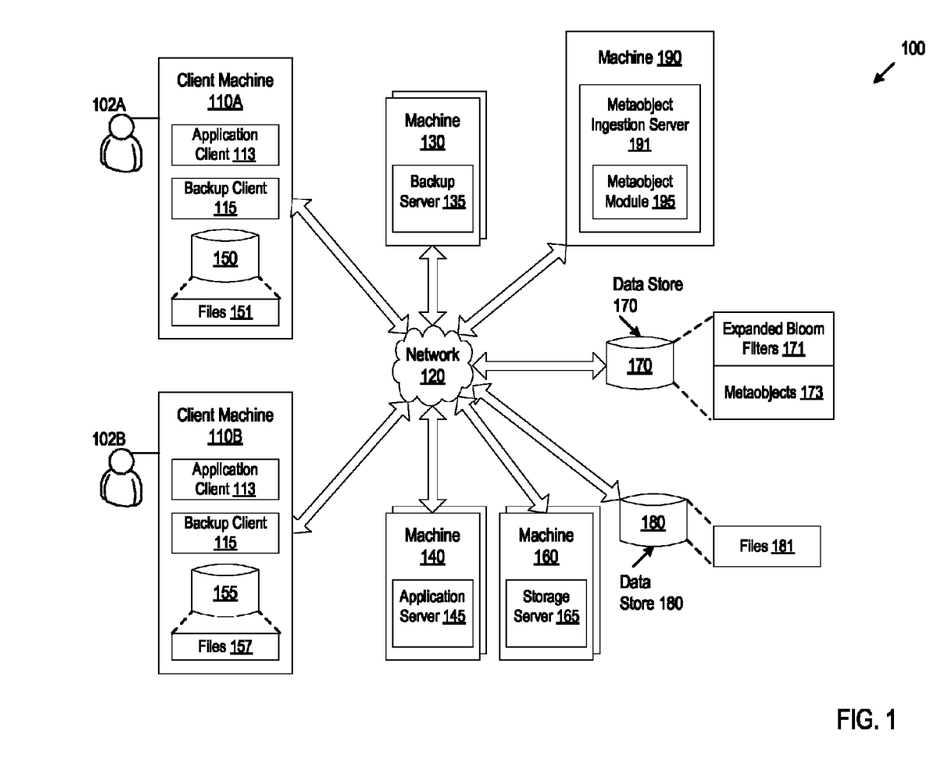
FIG. 1 illustrates example system architecture, in accordance with various implementations.

FIG. 1 is an example system architecture 100 in which implementations of the present disclosure can be implemented. The system architecture 100 can include one or more machines 130,140,155,190 and one or more client machines 110A-B connected via one or more networks 120. The networks 120 may be one or more public networks, one or more private networks, or one or more combinations thereof. In one implementation, not all machines 130,140, 155,190, client machines 110A-B, and/or data stores 170, 180 are not directly connected to each other. The networks 120 may be separate networks. In one implementation, architecture 100 includes a storage area network and a computer network as separate networks. The machines 130, 140,155,190 can include, and are not limited to, any data processing device, such as a desktop computer, a laptop computer, a mainframe computer, a personal digital assistant, a server computer, a handheld device or any other device configured to process data. A client machine 140A-B can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

The client machines 140A-B can store data as files 151,157 in data stores 150,155 that are coupled to the client machines 140A-B. A data store 150,155 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The machine 160 can include a storage server 105 to store data as files 181 on storage devices (e.g., data stores 180). The data stores 170,180 may be mass storage devices, such as magnetic or optical storage based disks, solid-state drives (SSDs) or hard drives. In one implementation, the system architecture 100 includes a distributed file system that may be a network attached storage file system that includes one or more machines 160 and one or more data stores 170,180. The storage server 105 can manage access to the files 181. The client machines 140A-B can host one or more applications 113, which may create or request access to the files 151,157,181 via the storage server 105. An application 113 can be any type of application including, for example, a web application, a desktop application, a browser application, etc.

The machines 130,140 can include servers to provide services, such as, and not limited to backup, archive, data loss prevention (DLP), anti-virus, data governance, discovery, forensics, policy (e.g., security policy, access policy) optimization, auditing, data sharing analysis, etc. Some servers can generate context metadata and/or content metadata. For example, machine 130 can include a backup server 135 that can generate context metadata items and content metadata items when backing up a file. The backup server 135 can communicate with a backup client 115 hosted on the client machines 140A-B to backup data 151,157 stored on the client machines 140A-B. In another example, machine 140 can include an application server 145 that may be a DLP server that generates content metadata items when examining the content of file. The application server 145 can communicate with an application client 113 hosted on the client machines 140A-B.

The machine 190 can include a metaobject ingestion server 191 to provide and manage a central metaobject data store. The metaobject ingestion server 191 can encode context metadata items and/or content metadata items, which are generated by servers (e.g., backup server 135, application server 145) in the system architecture 100, to create the metaobjects 173 of the metadata items. The metaobjects 173 can be stored in a data store 170 that is coupled to the metaobject ingestion server 191. The metaobject ingestion server 191 can include a metaobject module 195 to receive context metadata items from servers (e.g., backup server 135) and content metadata items from servers (e.g., backup server 135, application server 145) and create temporally expanded bloom filters 171 to represent the metaobjects for the metadata items 173 that are stored in the data store 170.

When the metaobject module 195 receives context metadata items and content metadata items from the servers (e.g., backup server 135, application server 145), the metaobject module 195 can use the expanded bloom filters 171 to determine whether or not there is a metaobject that is already stored in the data store 173 for the corresponding context metadata item and/or corresponding content metadata item. If there is not, the metaobject module 195 can add a metaobject for a corresponding context metadata item and/or corresponding content metadata item to the data store 173.

The metaobject module 195 can expand the bloom filters 171 "temporally" by rotating through different bloom filters 171 based on time to increase the integrity of the expanded bloom filters 171 and decrease the likelihood of the expanded bloom filters 171 returning false positives.

Figure 2:
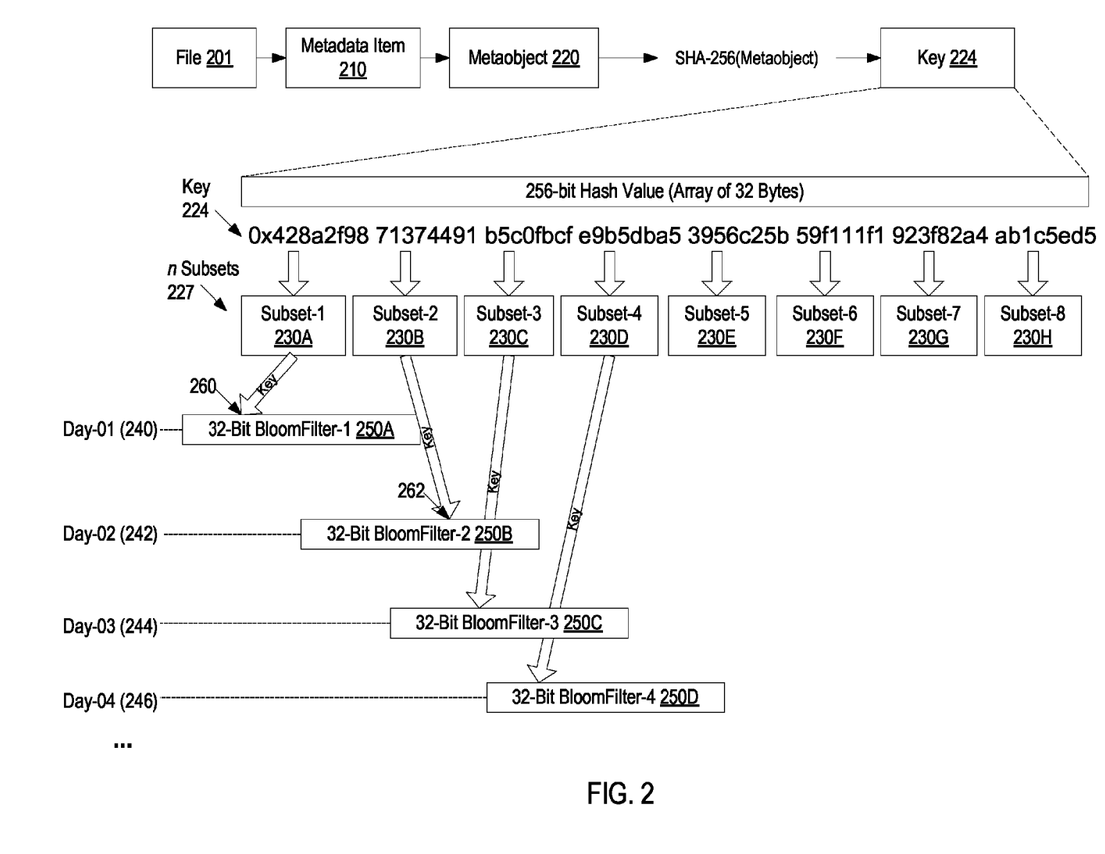
FIG. 2 is a block diagram illustrating example temporally expanded bloom filters.

FIG. 2 is a block diagram illustrating example temporally expanded bloom filters. The metaobject module (e.g., metaobject module 195 in FIG. 1) can be configured to use a key space that is k bits. For example, the key space may be k=256-bits. The metaobject module can divide the key space into n subsets. For example, there may be n=8 subsets. Each subset can include k/n bits. For example, each subset can include 32-bits. The subsets may have non-overlapping bits and/or overlapping bits. For example, Keyspace-Subset-01 may include bits [0-7], Keyspace-Subset-02 may include bits [8-15], etc. In another example, Keyspace-Subset-01 may include bits [0-7], Keyspace-Subset-02 may include bits [6-13], etc.

The metaobject module can create and assign a bloom filter to each subset. For example, BloomFilter-01 may correspond to Keyspace-Subset-01, BloomFilter-02 may correspond to Keyspace-Subset-03, etc. A bloom filter is a bit array of m number of bits. For example, the BloomFilter-01 may be m=32-bits. Each cell in the bit array of the bloom filter includes a bit. The bit array can be keyed using a hash function (e.g., SHA-256) to map the keys to the bits.

Each key space subset can be assigned to a time period. For example, Keyspace-Subset-01 may correspond to Day-01 240, Keyspace-Subset-02 may correspond to Day-02 242, Keyspace-Subset-03 may correspond to Day-03 244, Keyspace-Subset-02 may correspond to Day-04 246, etc. Each bloom filter (e.g., 32-bit bloom filters 250A-D) can be assigned to a time period. For example, BloomFilter-01 250A may correspond to Day-01 240, BloomFilter-02 250B may correspond to Day-02 242, BloomFilter-03 250C may correspond to Day-03 244, BloomFilter-04 250D may correspond to Day-04 246, etc. When the number of bloom filters is doubled, the overall sum of the bits in the filters is increased by one bit. For example, on Day-02 (242) there may two bloom filters and there may be one bit added to the overall sum of the bits in the filters. On Day-04 (246) there may be four bloom filters and there may be another bit that is added to the overall sum of the bits in the filters. On Day-08 there may be eight bloom filters and there may be another bit that is added to the overall sum of the bits in the filters. On Day-16 there may be sixteen bloom filters and there may be another bit that is added to the overall sum of the bits in the filters, which can result in 36-bit filters. Adding a bit to the overall sum of the bits in the filters when the number of bloom filters doubles significantly lessens the likelihood of a false hit.

File 201 may have a metadata item 210 (e.g., context metadata and/or content metadata). The metaobject module may encode the metadata item 210 using JSON (JavaScript Object Notation) to create metaobject 220. The metaobject module may perform a hash function (e.g., SHA-1, SHA-256) on the metaobject 220 to compute a hash value that serves as a key space for the metaobject 220. For example, the metaobject module computes SHA-256 hash value for metaobject 220 as key 224. Key 224 can be an array of 32 bytes, which can be represented as an array of 32 unsigned character values For example, key 224 may be "0x428a2f98 71374491 b5c0fbcf e9b5dba5 3956c25b 59f111f1 923f82a4 ab1c5ed5".

The metaobject module can divide the key 224 into n subsets (e.g., n=8). For example, key 224 may be divided into Subset-01 230A to Subset-08 230H. The subsets 230A-H can have the same number of bits as the key space subsets (e.g., Keyspace-Subset-01, etc.). For example, the subsets 230A-H have k/n=32-bits.

Depending on the time period, the metaobject module can select a subset of the key 224 to use as a key to locate a bit in a corresponding bloom filter. For example, if the time period is Day-01 (240), the metaobject module may select Subset-01 230A of key 224. Subset-01 230A may be the first byte of key 224. For example, Subset-01 230A may be "0x428a2f98". The metaobject module can determine the binary value of Subset-01 230A and use the binary value of Subset-01 230A as a key to locate a bit in a corresponding bloom filter. For example, if the time period is Day-01 (240), BloomFilter-01 250A may be used. The binary value of Subset-01 230A may point to the bit at position 260 in BloomFilter-01 250A. The bit at position 260 may be set to "0" to indicate that metaobject 220 is not stored in the data store or may be set to "1" to indicate that metaobject 220 is likely stored in the data store. If the bit at position 260 is set to "0", then the metaobject module can add metaobject 220 to the data store and can set the bit at position 260 to "1" to indicate that metaobject 220 is likely stored in the data store. Subsequently, when the metaobject module checks bloom filter 250A to determine whether metaobject 220 is already stored in the data store, the metaobject module can detect the bit at position 260 is set to "1".

In another example, if the time period is Day-02 (242), the metaobject module may select Subset-02 230B of key 224. Subset-02 230B may be the second byte of key 224. For example, Subset-02 230A may be "71374491". The metaobject module can determine the binary value of Subset-02 230B and use the binary value of Subset-02 230B as a key to locate a bit in the corresponding bloom filter, which may be BloomFilter-02 250B for Day-02 (242). The binary value of Subset-02 230B may point to the bit at position 262 in BloomFilter-02 250B. The bit at position 262 may be set to "0" to indicate that metaobject 220 is not stored in the data store or may be set to "1" to indicate that metaobject 220 is likely stored in the data store.

In some implementations, the bloom filters use h number of different hash functions. For example, a bloom filter may use h=2 hash functions. Examples of hash functions can include, and are not limited to, MD5, SHA-1 (Secure Hash Algorithm)-1, SHA-256, etc. The metaobject module can perform multiple hash functions on the metaobject 220 to compute two hash values. The metaobject module can select a subset from the first hash value and determine whether the corresponding bit in the bit array in the bloom filter is set to "0" or "1". The metaobject module can select a corresponding subset from the second hash value and determine whether the corresponding bit in the bit array in the bloom filter is set to "0" or "1". If the two bits are set to "1," then the result is that the metaobject (e.g., metaobject 220) is likely stored in the data store. If the one of the two bits are set to "0," then the result is that the metaobject (e.g., metaobject 220) is not stored in the data store.

Figure 3:
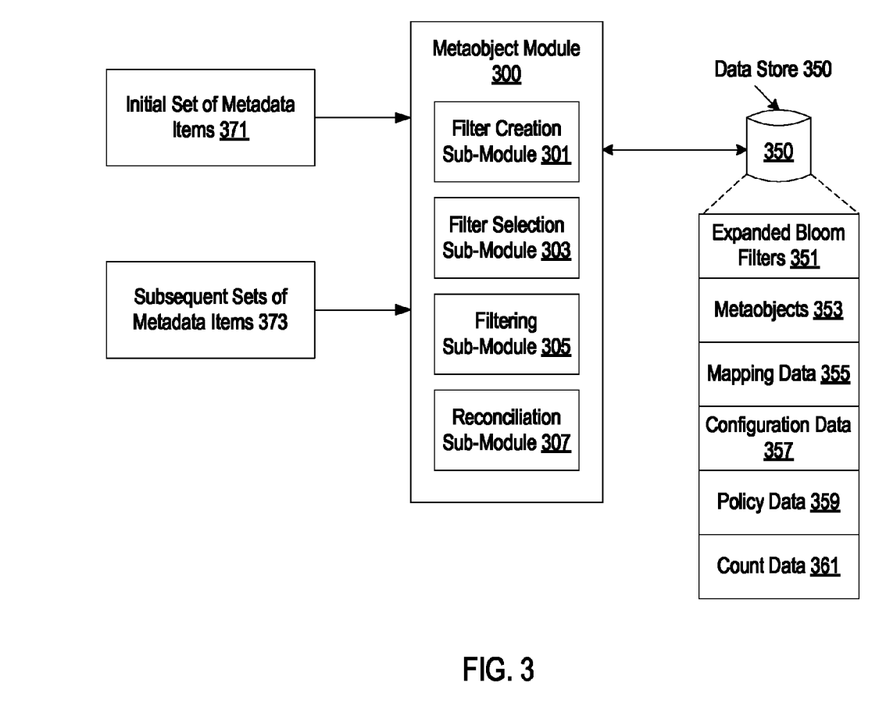
FIG. 3 is a block diagram of an implementation of a metaobject module for providing a centralized metaobject ingest using temporally expanded bloom filters.

FIG. 3 is a block diagram of one implementation of a metaobject module 300 providing centralized ingestion of metaobjects using temporally expanded bloom filters. The metaobject module 300 may be the same as the metaobject module 195 in a server 191 in a machine 190 of FIG. 1. The metaobject module 300 can include a filter creation sub-module 301, a filter selection sub-module 303, a filtering sub-module 305, and a reconciliation sub-module 307. Note that in alternative implementations, the functionality of one or more of the filter creation sub-module 301, filter selection sub-module 303, filtering sub-module 305, and reconciliation sub-module 307 are combined or divided.

The filter creation sub-module 301 can use configuration data 357 to create the bloom filters 351 and store the bloom filters 351 in a data store 350 that is coupled to the metaobject module 300. The configuration data 357 can be pre-defined and/or user (e.g., system administrator) defined. The configuration data 357 can be stored in the data store 350. The filter creation sub-module 301 can expand the bloom filters 351 by dividing a key space into subsets and by assigning a bloom filter to each subset. For example, the configuration data 357 may specify that a key space should be k=256-bits and divided into n=8 subsets. The number of bloom filters can correspond to n (e.g., eight bloom filters). The configuration data 357 can specify the number of bits that should be used for each bloom filter 351. For example, the configuration data 357 may specify that each bloom filter should be k/n=32-bits.

The filter creation sub-module 301 can assign a bloom filter to each subset in a key space. For example, the filter creation sub-module 301 can assign Bloom-Filter-01 to the first 32-bit subset (e.g., Subset-01), Bloom-Filter-02 to the second 32-bit subset (e.g., Subset-02), and Bloom-Filter-03 to the third 32-bit subset (e.g., Subset-03), etc.

The bits in each bloom filter may be initially set to "0" to indicate that there are no metaobjects that are stored in the data store 350. The filter creation sub-module 301 can populate the bloom filters 351 based on which metaobjects 353 are stored in the data store. The filter creation sub-module 301 can receive an initial set of metadata items 371 from one or more systems. For example, the metaobject module 300 may receive an initial set of metadata items 371 from a backup system. The filter creation sub-module 301 can perform a full ingest of the initial set of metadata items 371 by encoding the individual metadata items 371 in the set to create corresponding metaobjects 353, and storing the metaobjects 353 in the data store 350. One implementation of encoding an initial set of metadata items is described in detail below in conjunction with FIG. 4.

The filter creation sub-module 301 can populate the bloom filters 351 to reflect the metaobjects 353 that are stored in the data store 350 for the initial set of metadata items 371. The filter creation sub-module 301 can perform one or more hash functions (e.g., SHA-256, SHA-1) on the individual metaobjects 353 to compute a corresponding hash value for each metaobject 353. The filter creation sub-module 301 can divide each hash value into n (e.g. 8) subsets. The filter creation sub-module 301 can populate a bloom filter using the corresponding subsets of hash values of the metaobjects. For example, the initial set of metadata items 371 may include five hundred metadata items. The filter creation sub-module 301 may encode the five hundred metadata items to create five hundred metaobjects and may compute hash values for the five hundred metaobjects. The filter creation sub-module 301 may take the first 32-bit subset (e.g., Subset-01) of each of the five hundred hash values and may use the five hundred subsets (e.g., Subsets-01) to populate Bloom-Filter-01.

The binary values of the subsets of hash values map to bit locations in the bit array in the bloom filter 351 (e.g., Bloom-Filter-01). The filter creation sub-module 301 can set the corresponding bits in the bloom filter 351 (e.g., Bloom-Filter-01) to "1" to indicate that the corresponding metaobject is stored in the data store 350. The filter creation sub-module 301 can populate additional bloom filters 351 (e.g., Bloom-Filter-02, Bloom-Filter-03, Bloom-Filter-04, etc.) using the corresponding subsets of hash values of the metaobjects for the initial set of metadata items. One implementation of populating additional bloom filters is described in greater detail below in conjunction with FIG. 4.

In one implementation, the filter creation sub-module 301 creates one or more s supplementary sets of n filters, each partially overlapping with the previous set, for example, and not limited to, by shifting the starting offset of each subset by one. In one implementation, the filter creation sub-module 301 repeats the full ingest over a period of n days, populating s filters/day, or over s*n days at one filter/day, etc.

The filter creation sub-module 301 can assign the expanded bloom filters 351 to periods of time. A period can be pre-defined and/or user (e.g., system administrator) defined. For example, a period may be a day. For example, Bloom-Filter-01 may be assigned Day-01, Bloom-Filter-02 may be assigned to Day-02, etc. The configuration data 357 can specify the period of time and can store which bloom filters are assigned to which periods of time.

When the metaobject module 300 subsequently receives additional sets of metadata items 373, the filter selection sub-module 303 can select a bloom filter to use for ingestion of the subsequent sets of metadata items 373 based on a schedule that rotates through the bloom filters based on time. The filtering sub-module 305 can use the selected bloom filter to perform subsequent ingests of the sets of metadata items 373 that are received from one or more systems (e.g., backup system, archive system, etc.).

The filter selection sub-module 305 can determine the period state, for example, from a timer that is coupled to the filter selection sub-module 305. For example, the current period may be Day-12, and the filter selection sub-module 305 may select the Bloom-Filter-12 that corresponds to the current period of time (e.g., Day-12). The filter selection sub-module 303 can use one or more of the n (or s*n) filters every day in continuous rotation.

If the filtering sub-module 305 receives a hit on the selected bloom filter (e.g., Bloom-Filter-12), the filtering sub-module 305 can determine that the metaobject is likely stored in the data store 350 and does not ingest the metaobject. The filtering sub-module 305 can encode the individual metadata items in the sets of metadata items 373 to create corresponding metaobjects. The filtering sub-module 305 can perform one or more hash functions (e.g., SHA-256, SHA-1) on the individual metaobjects based on the configuration data 357 to compute corresponding hash values. The filtering sub-module 305 can divide each hash value into n (e.g. 8) subsets based on the configuration data 357.

The filtering sub-module 305 can use the binary value of the hash value subset to locate a bit in the corresponding bloom filter 351. If the bit is set to "0" the metaobject is not stored in the data store, and the filtering sub-module 305 can add the metaobject to the data store 350 and update the corresponding bit value to "1". The filtering sub-module 305 can track the number of metaobjects that are added to the data store 350 using count data 361. Each time a metaobject is stored in the data store 350, the filtering sub-module 305 can increment the count data 361 by one.

The metaobject module 300 can implement a two-state metaobject ingest. The first stage can include creating the temporally expanded bloom filters 351 and using the temporally expanded bloom filters 351 to determine whether to add metaobjects 353 to the data store 350. The first stage can be performed by the filter creation sub-module 301, the filter selection sub-module 303, and the filtering sub-module 305. The second stage can be an object-oriented stage that checks the integrity of the temporally expanded bloom filters 351. The second stage can be performed by the reconciliation sub-module 307.

A metaobject may not be stored in the data store 350, but one or more bloom filters 351 may have a corresponding bit that may be incorrectly set to "1" to indicate that the metaobject is likely stored in the data store 350. The incorrect bit setting can result in a false hit in that the filtering sub-module 305 may incorrectly detect the "1" and may not store the metaobject.

The reconciliation sub-module 307 can verify the expanded bloom filters 351 by validating the number of metaobjects that are ingested. The reconciliation sub-module 307 can create a batch of metaobjects relating to false hits and perform asynchronous comparisons to validate a large number of metaobjects, rather than synchronously on a per-object basis. The reconciliation sub-module 307 can detect and correct false hits in the expanded bloom filters 351 asynchronously. The reconciliation sub-module 307 can perform the detection and correction asynchronously, for example, by running per-client/policy count of the number of changed metaobjects, which should match between a system (e.g., backup) agent and the metabase ingest process for each image, or over a period of time as long as s*n−1 days.

For example, the reconciliation sub-module 307 can detect the false hit by comparing the number of ingested metaobjects in the count data 361 to system (e.g., backup) agent data. For example, the reconciliation sub-module 307 may receive the set of metadata items 373 from a backup agent on a client machine and/or a backup server. The set of metadata items 373 can include a preamble that indicates the number of new metadata items that are in the set of metadata items 373. For example, the preamble may indicate that forty-three metadata items in the set of metadata items 373 were changed on the backup system. The reconciliation sub-module 307 may detect from the count data 361 that forty-one metaobjects were ingested by the filtering sub-module 305 for the set of metadata items 373. The reconciliation sub-module 307 can ingest the two missing metaobjects from the original backup image. The reconciliation sub-module 307 can ingest the missing metaobjects from an original backup image at any time up to s*n−1 days after the original system operation (e.g., backup operation) to reconcile any inconsistencies. The data store 350 can store policy data 359 specifying that an ingest source system (e.g., backup, archive, DLP, anti-virus, discovery, etc.) maintain a copy of the raw metadata (e.g. raw image data) for each client machine for at least the last s*n system (e.g., backup) iterations. The reconciliation sub-module 307 can use the raw metadata to correct false hits.

The data store 350 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
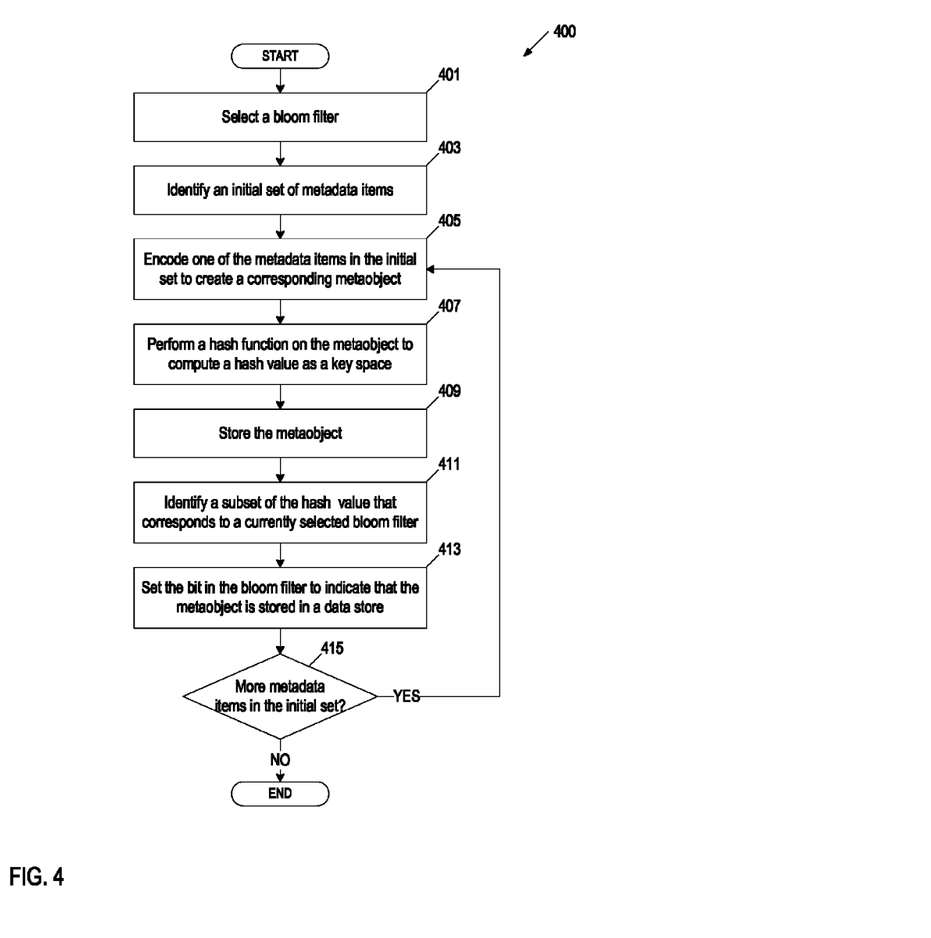
FIG. 4 is a flow diagram illustrating an implementation for a method for temporally expanding bloom filters for metaobjects.

FIG. 4 is a flow diagram of an implementation of a method 400 for creating temporally-expanded bloom filters and populating the temporally-expanded bloom filers using an initial set of metadata items. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a metaobject module 195 in a server (e.g., metaobject ingestion server 191) in a machine (e.g., machine 190) of FIG. 1.

At block 401, the server selects a bloom filter. The selected bloom filter corresponds to a portion of a key space. For example, the server may select Bloom-Filter-01 which may be a 32-bit filter that corresponds to a first subset (e.g., first byte) of a key space. At block 403, the server identifies an initial set of metadata items. The initial set of metadata items can include context metadata items and/or content metadata items. The server can receive the initial set of metadata items from one or more servers (e.g., backup server, archive server, DLP server, anti-virus server, discovery server, etc.) and/or can access one or more data stores that store the initial set of metadata items. For example, the server may receive an initial set of metadata items from a backup image from a backup server. At block 405, the server encodes one of the metadata items in the initial set of metadata items to create a corresponding metaobject. The server can use configuration data that is stored in the data store to determine which encoding scheme to use to create the metaobject. An example encoding scheme can include, and is not limited to, JSON (JavaScript Object Notation), XML (Extensible Markup Language). At block 407, the server performs a hash function on the metaobject to compute a hash value and stores the metaobject in the data store at block 409. In one implementation, the server performs one hash function. In another implementation, the server performs more than one hash function. The server can use configuration data that is stored in the data store to determine which hash function(s) to use. Examples of hash functions can include, and are not limited to, MD5, SHA-1, SHA-256, etc.

At block 411, the server divides the hash value of the metaobject into subsets and identifies one of the subsets that correspond to the currently selected bloom filter (e.g., Bloom-Filter-01). The server can divide the hash value of the metaobject into n subsets to create multiple subsets of hash values for the metaobject. The server can use the configuration data to determine how to divide the hash value into n subsets. For example, the currently selected bloom filter may be Bloom-Filter-01 that corresponds to the first byte of the hash value and the server may select the first byte of the hash value of the metaobject as the subset that corresponds to Bloom-Filter-01. At block 413, the server sets the bit at a location in the currently selected bloom filter (e.g., Bloom-Filter-01) that map to the binary value of the hash subset for the metaobject. The server can use binary value of the hash subset of the metaobject as a key to map to the location in the currently selected bloom filter (e.g., Bloom-Filter-01). The server can set the bit to "1" to indicate that the metaobject is stored in the data store.

At block 415, the server determines if there is another metadata item in the initial set of metadata items to process. If there is another metadata item, the server returns to block 405 to encode the metadata item to create a corresponding metaobject. At least a portion of method 400 can be an iterative. The number of iterations can be based on the number of metadata items in the initial set of metadata items. The number of iterations can be based on the number of bloom filters that are to be populated. For example, the server may return to block 401 to select another bloom filter. For example, the server may select Bloom-Filter-02 which may be a 32-bit filter that corresponds to a second subset (e.g., second byte) of the key space. In one implementation, the server populates one bloom filter and when the bloom filter retires, the server populates a new bloom filter. For example, the server may populate Bloom-Filter-02 when Bloom-Filter-01 retires. A bloom filter can retire when a large number of bits in the bit array in the bloom filter are populated. For example, Bloom-Filter-01 may be retired when 80% of the bits are populated. The configuration data can store a threshold that can be used to retire a bloom filter. In one implementation, the server retires one or more bloom filters at regular intervals as part of regular maintenance. The configuration data can store an interval for retiring bloom filters. In one implementation, the server populates more than one bloom filter at a time. For example, the server may populate Bloom-Filter-01 and Bloom-Filter-02 on Day-01. In one implementation, the server populates the bloom filters at regular intervals. In one implementation, the server populates a bloom filter when the server retires a bloom filter.

Figure 5:
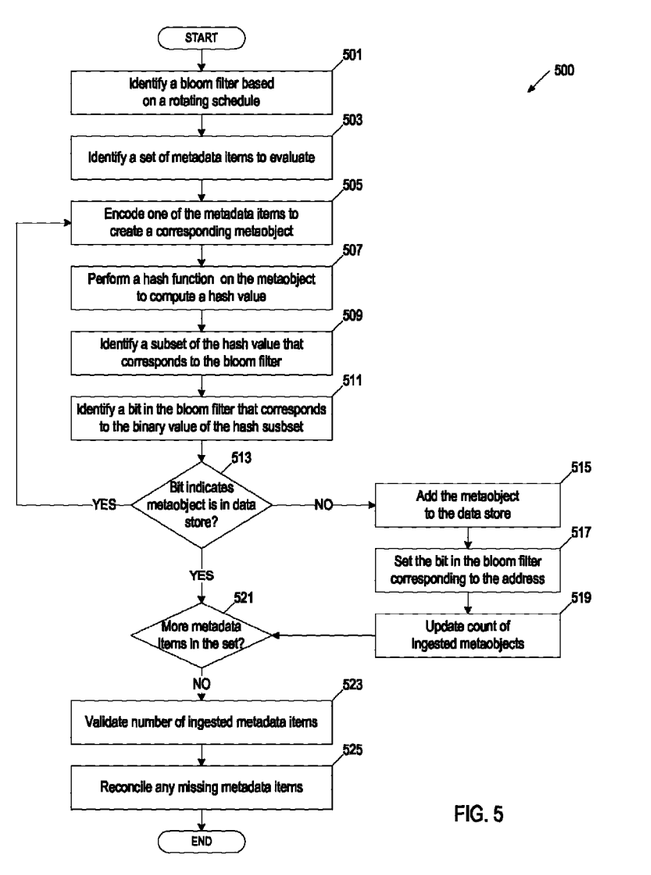
FIG. 5 is a flow diagram illustrating an implementation for a method for providing a centralized metaobject ingest using temporally expanded bloom filters.

FIG. 5 is a flow diagram of an implementation of a method 500 for providing centralized ingestion of metaobjects using temporally expanded bloom filters. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a metaobject module 195 in a server (e.g., metaobject ingestion server 191) in a machine (e.g., machine 190) of FIG. 1.

At block 501, the server identifies a bloom filter based on a rotating schedule. The schedule rotates through a number of bloom filters based on time. For example, the current time period may be Day-03 and the server may select Bloom-Filter-03 which corresponds to Day-03 based on the rotating schedule. On the next day, Day-04, the server may select Bloom-Filter-04 which corresponds to Day-04. At block 503, the server identifies a set of metadata items to evaluate. The server may have received the metadata items from one or more servers (e.g., backup server, archive server, DLP server, anti-virus server, discovery server, etc.) and/or can access one or more data stores that store the metadata items. The set of metadata items may be substantially the same as a previous set of metadata items. For example, the server may receive a set of metadata items from a backup server for a current backup, and the set of metadata items may be substantially the same as a previous set of metadata items for a backup that was performed the previous day. The metadata items can include context metadata items and/or content metadata items.

At block 505, the server encodes one of the metadata items to create a corresponding metaobject. In one implementation, the server encodes the metadata item using JSON (JavaScript Object Notation). At block 507, the server performs a hash function on the metaobject to compute a hash value. The server performs a hash function on the metaobject to create a unique identifier for the metaobject. The server is creating a message digest of the metaobject. In one implementation, the server performs one hash function. In another implementation, the server performs more than one hash function. The server can use configuration data that is stored in the data store to determine which hash function(s) to. Examples of hash functions can include, and are not limited to, MD5, SHA-1, SHA-256, etc.

At block 509, the server divides the hash value of the metaobject into subsets and identifies one of the subsets that corresponds to the currently selected bloom filter (e.g., Bloom-Filter-03). The server can divide the hash value of the metaobject into n subsets to create multiple subsets of hash values for the metaobject. The server can use the configuration data to determine how to divide the hash value into n subsets. For example, the currently selected bloom filter may be Bloom-Filter-03 that is for the third subset (e.g., Subset-03) of a hash value key space and the server may select the third subset (e.g., third byte) of the hash value of the metaobject as the subset that corresponds to Bloom-Filter-03.

At block 511, the server identifies a bit in the currently selected bloom filter that corresponds to the binary value of the hash subset (e.g., Subset-03). At block 513, the server determines whether the corresponding bit in the currently selected bloom filter indicates that the metaobject is stored in the data store. For example, if the bit is set to "1," the metaobject is likely stored in the data store and the server determines whether there is another metadata item in the set to evaluate at block 521.

If the bit is set to "0" (block 513), the metaobject is not stored in the data store, and the server adds the metaobject to the data store at block 515. At block 517, the server sets the corresponding bit in the currently selected bloom filter to "1" to reflect that the metaobject is added to the data store. At block 519, the server updates the count data to reflect the number of metaobjects from the set of metadata items that were ingested. For example, the server increments the count by one. The count data can be stored in a data store that is coupled to the metaobject module.

If there is another metadata item to evaluate (block 521), the server returns to block 503 to encode another metadata item to create another metaobject. At least a portion of method 500 can be an iterative. The number of iterations can be based on the number of metadata items in the set of metadata items.

If there is not another metadata item to evaluate (block 521), the server validates the number of metadata items that are ingested. The server can identify data that indicates the number of new metadata items that are in the set of metadata items. For example, the server may receive the set of metadata items as a backup image that includes a preamble that has an indicator of how many new metadata items are in the set of metadata items. For example, the preamble may indicate that forty-three metadata items in the set of metadata are new. The server can determine whether the number of new metadata items in the preamble matches the count of the number of metaobjects that were added to the data store. For example, the server may detect that the count indicates that forty-one metaobjects were ingested and that two more metaobjects from the set of metadata items should have been ingested.

At block 525, the server can reconcile any missing metadata items. For example, the server can ingest the two metadata items that were not ingested. The data store can store identifiers of the metaobjects that were added to the data store. In one implementation, the server uses the original backup image to ingest the missing metadata items. The server can ingest the missing metadata items from the original image at any time up to s*n−1 days after the original system operation (e.g., backup operation) to reconcile any inconsistencies. The server can create metaobjects that correspond to the metadata items that were not ingested and can add the metaobjects to the data store to reconcile any differences.

Figure 6:
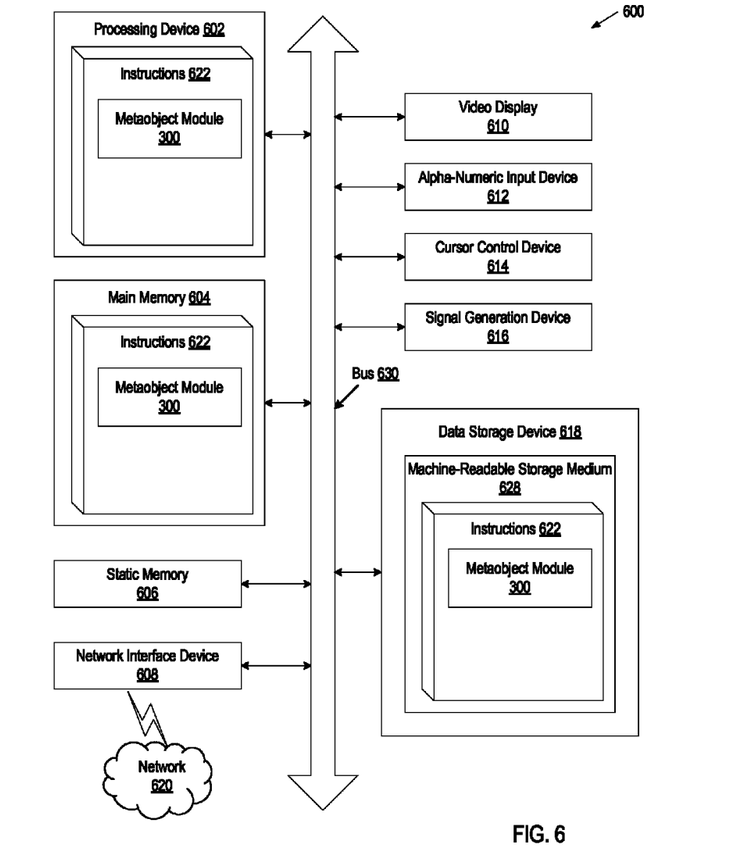
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions 622 or software embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a relationship module (e.g., metaobject module 300 of FIG. 3) and/or a software library containing methods that call modules in a relationship module and/or an analysis module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "encoding" or "performing" or "dividing" or "setting" or "adding" or "locating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    identifying a first bloom filter using a schedule comprising a rotation of a plurality of bloom filters based on time;
    identifying at least a first metaobject to evaluate for ingestion using the first bloom filter;
    deriving a first hash value from the first metaobject;
    identifying a first subset of the first hash value based on the schedule, wherein the first subset is smaller in size than the first hash value;
    determining, by a server computer system, whether to add the first metaobject to a data store using the first bloom filter and the first subset of the first hash value;
    identifying a second bloom filter using the rotation in the schedule;
    identifying at least a second metaobject to evaluate for ingestion using the second bloom filter;
    deriving a second hash value from the second metaobject;
    identifying a second subset of the second hash value based on the schedule, wherein the second subset is smaller in size than the second hash value; and
    determining, by the server computer system, whether to add the second metaobject to the data store using the second bloom filter and the second subset of the second hash value.

2. The method of claim 1, wherein the plurality of bloom filters correspond to different time periods.

3. The method of claim 1, wherein the first metaobject and the second metaobject are associated with at least one of a backup data, archive data, data loss prevention data, anti-virus data, or discovery data.

4. The method of claim 1, further comprising:
    encoding an initial set of metadata items to create an initial plurality of metaobjects;
    performing a hash function on the initial plurality of metaobjects to generate a plurality of hash values;
    dividing each of the plurality of hash values into subsets of hash values; and
    setting bits in at least one of the first bloom filter or the second bloom filter using the subsets of hash values.

5. The method of claim 1, wherein the first metaobject and the second metaobject comprise at least one of an identifier of a file, an owner of the file, a time of modifying the file, protection bits for the file, or a pathname for the file.

6. The method of claim 1, wherein determining whether to add the first metaobject to the data store comprises:
locating a bit in the first bloom filter that corresponds to a binary value of the first subset of the first hash value; and
adding the first metaobject to the data store if the bit indicates that the first metaobject is not stored in the data store.

7. The method of claim 1, further comprising:
identifying data indicating a number of new metadata items;
determining that the number of new metadata items does not match a number of metaobjects added to the data store;
identifying one or more additional metadata items to be added to the data store; and
adding one or more metaobjects corresponding to the one or more additional metadata items to the data store.

8. A system comprising: a memory; and a processing device, coupled with the memory, to:
identify a first bloom filter using a schedule comprising a rotation of a plurality of bloom filters based on time;
identify at least a first metaobject to evaluate for ingestion using the first bloom filter;
derive a first hash value from the first metaobject;
identify a first subset of the first hash value based on the schedule, wherein the first subset is smaller in size than the first hash value;
determine whether to add the first metaobject to a data store using the first bloom filter and the first subset of the first hash value;
identify a second bloom filter using the rotation in the schedule;
identify at least a second metaobject to evaluate for ingestion using the second bloom filter;
derive a second hash value from the second metaobject;
identify a second subset of the second hash value based on the schedule, wherein the second subset is smaller in size than the second hash value; and
determine whether to add the second metaobject to the data store using the second bloom filter and the second subset of the second hash value.

9. The system of claim 8, wherein the plurality of bloom filters correspond to different time periods.

10. The system of claim 8, wherein the first metaobject and the second metaobject are associated with at least one of a backup data, archive data, data loss prevention data, anti-virus data, or discovery data.

11. The system of claim 8, wherein the processing device is further to:
encode an initial set of metadata items to create an initial plurality of metaobjects;
perform a hash function on the initial plurality of metaobjects to generate a plurality of hash values;
divide each of the plurality of hash values into subsets of hash values; and
set bits in at least one of the first bloom filter or the second bloom filter using the subsets of hash values.

12. The system of claim 8, wherein the first metaobject and the second metaobject comprise at least one of an identifier of a file, an owner of the file, a time of modifying the file, protection bits for the file, or a pathname for the file.

13. The system of claim 8, wherein determining whether to add the first metaobject to the data store comprises:
locating a bit in the first bloom filter that corresponds to a binary value of the first subset of the first hash value; and
adding the first metaobject to the data store if the bit indicates that the first metaobject is not stored in the data store.

14. The system of claim 8, wherein the processing device is further to:
identify data indicating a number of new metadata items;
determine that the number of new metadata items does not match a number of metaobjects added to the data store;
identify one or more additional metadata items to be added to the data store; and
add one or more metaobjects corresponding to the one or more additional metadata items to the data store.

15. A non-transitory computer readable storage medium including instructions that, when executed by a processing device, cause the processing device to perform a set of operations comprising:
identifying a first bloom filter using a schedule comprising a rotation of a plurality of bloom filters based on time;
identifying at least a first metaobject to evaluate for ingestion using the first bloom filter;
deriving a first hash value from the first metaobject;
identifying a first subset of the first hash value based on the schedule, wherein the first subset is smaller in size than the first hash value;
determining, by the processing device, whether to add the first metaobject to a data store using the first bloom filter and the first subset of the first hash value;
identifying a second bloom filter using the rotation in the schedule;
identifying at least a second metaobject to evaluate for ingestion using the second bloom filter;
deriving a second hash value from the second metaobject;
identifying a second subset of the second hash value based on the schedule, wherein the second subset is smaller in size than the second hash value; and
determining, by the processing device, whether to add the second metaobject to the data store using the second bloom filter and the second subset of the second hash value.

16. The non-transitory computer readable storage medium of claim 15, wherein the plurality of bloom filters correspond to different time periods.

17. The non-transitory computer readable storage medium of claim 15, wherein the first metaobject and the second metaobject are associated with at least one of a backup data, archive data, data loss prevention data, anti-virus data, or discovery data.

18. The non-transitory computer readable storage medium of claim 15, wherein the operations further comprise:
encoding an initial set of metadata items to create an initial plurality of metaobjects;
performing a hash function on the initial plurality of metaobjects to generate a plurality of hash values;
dividing each of the plurality of hash values into subsets of hash values; and
setting bits in at least one of the first bloom filter or the second bloom filter using the subsets of hash values.

19. The non-transitory computer readable storage medium of claim 15, wherein determining whether to add the first metaobject to the data store comprises:

locating a bit in the first bloom filter that corresponds to a binary value of the first subset of the first hash value; and adding the first metaobject to the data store if the bit indicates that the first metaobject is not stored in the data store.

20. The non-transitory computer readable storage medium of claim 15, wherein the operations further comprise:

identifying data indicating a number of new metadata items;

determining that the number of new metadata items does not match a number of metaobjects added to the data store;

identifying one or more additional metadata items to be added to the data store; and adding one or more metaobjects corresponding to the one or more additional metadata items to the data store.

* * * * *